Jan. 31, 1961  H. SCHWARTZ  2,969,722
PHOTOGRAPHIC CAMERA
Filed Dec. 9, 1957  2 Sheets-Sheet 1

Jan. 31, 1961  H. SCHWARTZ  2,969,722
PHOTOGRAPHIC CAMERA
Filed Dec. 9, 1957  2 Sheets-Sheet 2

2,969,722
Patented Jan. 31, 1961

2,969,722

PHOTOGRAPHIC CAMERA

Hans Schwartz, Hamburg, Germany, assignor, by mesne assignments, to Agfa Aktiengesellschaft, Leverkusen-Bayerwerk, Germany Filed Dec. 9, 1957, Ser. No. 701,531

Claims priority, application Germany Dec. 14, 1956

17 Claims. (Cl. 95—31)

The invention relates to a film-winding drive for photographic cameras which on its operation effects film winding by an image length or frame and at the same time pulls up the shutter and, if required, operates further connections preparing for readiness for taking.

The previously known film drives of the kind mentioned operate either with a purely manual drive or with a spring mechanism which is drawn up to prepare for taking and is then in a position to effect a plurality of film windings or advances and shutter repositionings. These purely mechanical systems require a considerable number of driving and connecting elements in order to provide for the usual precautions against double exposure (release locking) and double winding (advance or drive locking). The present invention has the object of considerably reducing the constructional parts of the film drive for photographic cameras and also to simplify the construction of the remaining driving parts.

To solve the above-stated problem, it is proposed according to the invention to provide an electric motor for actuating the film drive, which is energised from a source of current preferably arranged in the camera casing and is switched on for an operating phase in dependence upon the actuation of the shutter release. By the arrangement of an electromotor, a large part of the driving elements, which must otherwise be provided between the film advance means, the shutter and the release mechanism, are dispensed with.

Preferably, the housing of the electric motor is mounted rotatably and is constructed as a film winding spool, which is driven by way of a reduction gear from the rotor shaft of the electric motor. By such a construction, the unused inner space of the wind-up spool can be employed in an ideal way in order to house the motor, which otherwise requires no additional space. The current supply to the electric motor is preferably provided by way of two slip rings arranged concentrically to one another at the front of the motor, which are connected by sliding contacts through the intermediary of a switch device with a battery mounted in the camera casing. Instead of a battery mounted within the camera casing, an external current source can be provided if required, for example, the transportable accumulator of an electronic flash device or other direct potential source, which can then be brought into connection with the sliding contacts of the motor over a separate connector provided in the camera casing.

In order to initiate a driving movement for the shutter, a crank drive is provided according to the invention, which is rotated through about 360° by the electric motor or by its drive at each operating phase, in order to rotate the take-up shaft through the amount required for tensioning the shutter with its shaft via a toothed wheel drive and a one-way coupling.

In order to ensure that the electric motor only moves the film by one image length or frame via its drive in any operating phase, a driving wheel, particularly a separate film sprocket engaging in the perforations of the film, with contact segments interrupted according to the frame separation, is provided, which forms together with the sliding contacts an automatic switch connection in the motor energising circuit. This switch device preferably consists of two conductive, interconnected circular contact strips, one of which is interrupted corresponding to the frame separation by insulating pieces, so that the connection between two sliding contacts provided for actuating the motor, one of which touches the first and the other the second contact strip, is interrupted automatically after a film advance by an image length or frame. In order that the motor, after actuation of the release, can be set in motion on interruption of the motor energising circuit at the switch device, an additional connector coupled with the release is provided, which bridges over the two sliding contacts insulated with respect to the starting position until, by movement of the motor, the drive and film the automatic switch device closes the motor energizing circuit again. This additional connector is preferably a third sliding contact, which is connected with the sliding contact of the discontinuous contact strip and can be briefly brought into contact by release of the shutter with the continuous contact strip, particularly by a cam which is secured to the take-up shaft of the shutter.

According to a further feature of the present invention, a driving connection is provided between the motor and the film spool, which can be coupled in as required in order to rewind the film.

Further details and features of the invention will be apparent from the following description of an embodiment given in conjunction with the accompanying drawings, in which.

Figure 1:
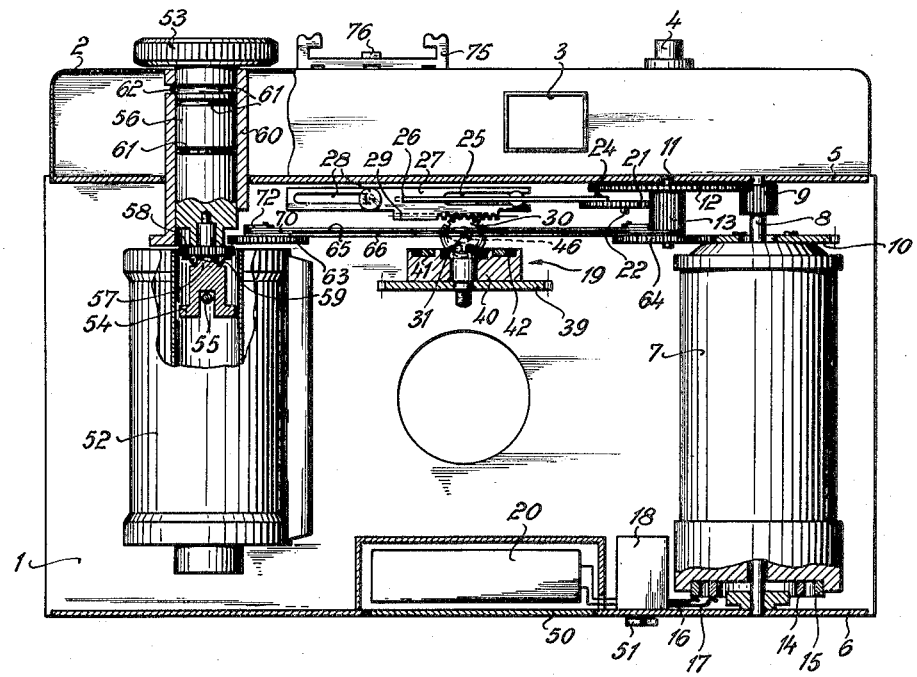
Fig. 1 shows a miniature camera in rear elevational view, with the rear wall removed, wherein certain parts of the motor, the drive, the switch device, the rewind device and the casing are shown in section.

The miniature camera shown in Fig. 1 consists of a casing 1, in the usual way, which can be opened in known manner in order to provide for insertion or removal of the film. At the upper side, the camera casing 1 is closed by a cap 2 in which is mounted the viewfinder or rangefinder 3 and the release button 4.

An electric motor 7 is mounted between an upper support plate 5 and a lower support plate 6, whose housing is constructed as a film-winding spool. The rotor shaft 8 of the electric motor is mounted in the two support plates 5 and 6 and provided with a driving pinion 9. The housing of the motor 7, which serves as the winding spool, is rotatably mounted on the rotor or rotor spindle 8 of the electric motor and connected with a driving gear wheel 10. The pinion 9 and the gear wheel 10 are arranged concentrically to one another. A gear wheel 12 is mounted laterally by the rotor spindle 8 in the camera casing on a spindle 11 and engages the pinion 9. A pinion 13 is rigidly connected with the gear wheel 12 and engages the gear wheel 10 of the motor housing. The gear wheels 9, 12, 13 and 10 form a reduction drive, which ensures that the number of revolutions of the electric motor 7 effect a rotation of the motor housing or winding spool 7 corresponding to the desired film advance speed.

The energising of the electric motor 7 is effected over two concentric slip rings 14 and 15 arranged at the front of the motor 7 or on the rotor spindle 8. The current supply to these two slip rings 14 and 15 is provided by two sliding contacts or spring blades 16 and 17, which are connected in a manner described subsequently with the main switch 18, the film advance switch device 19 and a battery 20.

Figure 2:
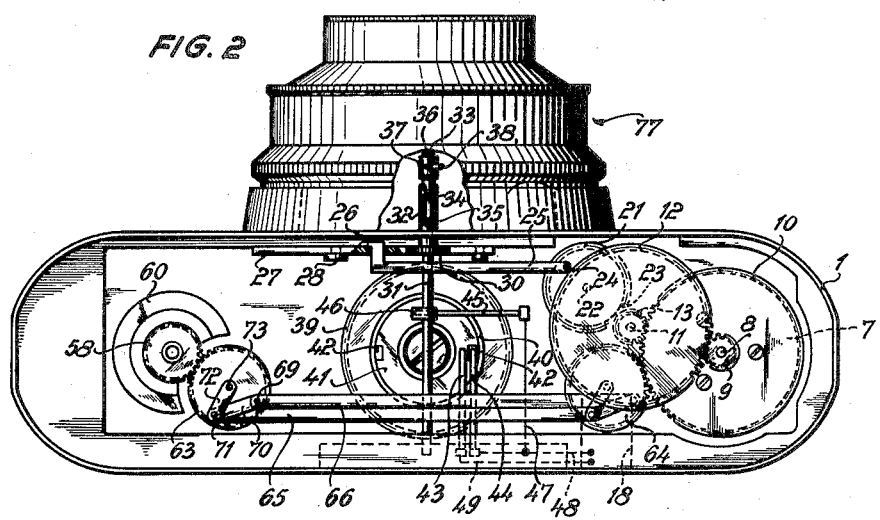
Fig. 2 shows a plan view of the miniature camera illustrated in Fig. 1 with the cap removed and the rewind knob pulled out.
Figure 3:
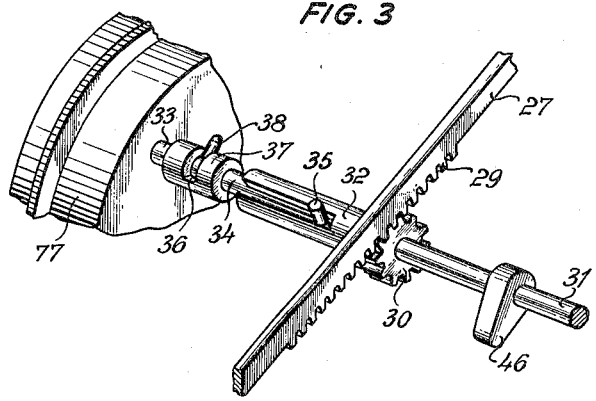
Fig. 3 shows a perspective view of the driving connection between the film drive and the shutter take-up shaft on an enlarged scale.

A gear wheel 21 is provided for effecting shutter operation, as can be seen principally in Fig. 2, which is mounted with a spindle 22 in a bearing plate (not shown) of the camera casing. This gear wheel 21 is so arranged and constructed that it can engage with the pinion 13. On rotation of the gear wheel 21, several teeth are advanced, so that a gap 23 is produced which, in the position shown in Fig. 2, ensures that no driving connection occurs between the pinion 13 and the gear wheel 21. The gear wheel 21 carries a crank pin 24 to which a connecting rod 25 is connected which forms with the gear wheel 21 a crank drive. The connecting rod 25 preferably engages with a hook-shaped projection 26 in a gear rack 27, which is mounted by means of a pin connection 28 for movement parallel to the front wall of the camera. The connection between the hook-shaped projection 26 of the connecting rod 25 and the gap in the gear rack 27 is so constructed that the connecting rod 25 can be pivoted about both its coupling points in the plane of the drawing of Fig. 2. By this kind of connection, the gear 27 moves backwards and forwards in parallel motion on a complete revolution of the gear wheel 21. The toothed section 29 of the gear rack 27 engages a pinion 30, which is rigidly disposed on a shaft 31 (Fig. 3). By the pinion 30, the shaft 31 carries a sleeve 32 provided with a longitudinal slot in which engages an intermediate spindle 34 connected with the take-up shaft 33. A guide pin 35 is arranged at the end of the intermediate spindle 34, which, with an axial setting of the objective and the shutter, can effect a longitudinal movement in the slot in the sleeve 32. A one-way coupling is provided as the driving connection between the take-up shaft 33 and the intermediate spindle 34. This one-way coupling is formed by a sleeve part 37 provided over a part of the circumference with a slot 36, which is rigidly connected with the intermediate spindle 34. The take-up shaft 33 engages in the aperture in the sleeve part 37 which carries a radially-directed guide pin 38 which can slide in the circumferential slot 36.

The taking up of the shutter 77, which is constructed in the usual way and is not described and illustrated in detail herein, is effected by rotation of the take-up shaft 33 about a fixed angle of, for example, 90°. The take-up movement is effected against the force of a spring which releases the shutter movements and therefore ensures after subsequent release that the take-up shaft is returned through the aforementioned angle. The operation of the shutter 77, presuming that the shutter 77 is in its stressed state, is effected by the electric motor as follows:

The position of the connecting rod 25 and the dimension of the peripheral slot 36 in the sleeve 37 are so chosen that the pin 38 carried by the take-up shaft moves the connecting rod 25 with the shutter 77 stressed by a slight amount from the position illustrated in Fig. 2. In this starting or rest position, one edge of the gap 23 provided in the gear wheel 21 rests on the pinion 13, so that when the pinion 13 is driven by the movement of the motor, the gear wheel 21 is rotated as well. By the rotation of the gear wheel 21, the connecting rod 25 undergoes movement to and fro, so that the gear rack 27 also undergoes to-and-fro movement in the same way. The gear wheel 21 is brought to a standstill in the position illustrated in Fig. 2 as soon as the gap 23 again extends into the region of the pinion 13, so that then no further movement of the connecting rod 25 and the gear rack 27 can occur. The gear rack 27 transmits in perforations in the film and is hence rotated on advancing movements of the film. In the present case, the film sprocket 39 is so constructed that its circumference corresponds to the length of two frames. On the upper side of the film sprocket, which is mounted in the camera casing in the usual way, an insulating piece 40 is provided which is covered by a contact plate 41. This contact plate 41 forms two interconnected, concentrically arranged contact strips of which the inner is continuous and the outer discontinuous. As shown particularly in Fig. 2, two opposed cavities 42 filled with insulating material are provided in the contact plate 41. The two contact strips of the contact plate 41 are touched by two sliding contacts or spring blades 43 and 44. These two sliding contacts 43 and 44 form an automatic switch device, with the contact plate 41, which is inserted as a switch contact in the energizing circuit of the motor 7. It is clear that, as long as the two sliding contacts 43 and 44 are in the position illustrated in Fig. 2, the motor energizing circuit is interrupted.

In order to ensure that advance of the film is effected after release of the shutter 77, it is necessary firstly to close the automatic switch device comprising the two sliding contacts 43 and 44 and the contact plate 41, until by rotation of the motor the drive, the wind-up spool and the film and hence also the gear wheel 39 are moved until the two sliding contacts 43 and 44 can make contact together over the contact plate 41, and thus the current supply to the motor is ensured its to-and-fro movement to the pinion 30, which then undergoes a to-and-fro movement in a corresponding manner. This movement of the pinion 30 carries forward the sleeve section 37 because of the split pin connection 32, 35. During the movement, one front edge of the transverse slot 36 within the sleeve part 37 actuates the guide pin 38 and a rotation of the take-up shaft 33 is effected. With the accompanying return movement, the shaft 33 and the guide pin 38 connected with it remain in the stressed position and no longer take part in the further rotation of the sleeve part 37. The take-up shaft 33 remains in its position until release of the shutter 77 is effected by pressure on the release knob 4 and the means (not shown in detail) connected with it. On release of the shutter 77, the take-up shaft 33 springs back into its rest position and, on this return movement, the guide pin 38 can move freely over a large extent, so that the shutter movement is not hindered. In the final phase of the return movement of the shaft 33, the guide pin 38 still rests against a side edge of the peripheral slot 36, so that the pinion 30 and hence the gear rack 27, the connecting rod 25 and the gear wheel 21 are also moved until one edge of the gap 23 of the gear wheel 21 can again engage the pinion 13. In this way, the starting position from which the shutter 77 has been pulled out is re-established.

In order to ensure that the advance of the film released by the electric motor corresponds exactly to one image length or frame, a film gear wheel or sprocket 39 is provided in the usual way, which engages until, after rotation of the gear wheel 39 through 180° corresponding to a frame length, an operative state is reached which corresponds to the position shown in Fig. 2 and necessarily involves interruption of the energizing circuit of the motor.

In order to effect this brief bridging of the two sliding contacts 43 and 44, a briefly-effective switch must be connected with the shutter 77 or the release button. In view of the valuable material of the contact member 41 and in order to achieve the most compact construction of the film drive, a third sliding contact 45 is arranged as the release switch for initiating the motor movement, which is mounted in the casing in the same way as the sliding contacts 43 and 44. This sliding contact 45 is so arranged in the region of the inner contact strip that it does not contact this, but can be brought into contact with the plate 41 by a cam 46, which is located on the spindle 31.

With reference to the preceding explanations, the advance of the film occurs as follows:

It is first assumed that all circuit parts are in the positions illustrated in Fig. 2. After release of the shutter 77, the spindle 31 runs counter to the tensioning direction and, together with the previously-described rotation of the pinion 30, effects a movement of the cam 46 which is arranged on the spindle 31. In its rotation, the front end or nose of the cam 46 briefly touches the sliding contact 45 and causes this to contact the plate 41. Since the sliding contact 45, as shown in Fig. 2, is connected by a lead 47 with the sliding contact 44, a short interconnection of the two leads 48 and 49 which pass to the sliding contacts 43 and 44 is produced. The motor energizing circuit is closed by the interconnection of the two leads 48 and 49, so that the motor rotates and hence the drive, the motor casing and the film move. The film sprocket 39 is likewise rotated by the film movement, so that the two sliding contacts 43 and 44 again come into conductive contact on the contact plate 41. In the intermediate time, the cam 46 again moves and opens the contact between the sliding contact 45 and the plate 41, so that after a half revolution of the film sprocket 39 the motor energizing circuit is again interrupted and the motor comes to rest. Should the return movement of the shutter shaft 33 and hence the actuation of the cam 46 occur too rapidly with respect to the energizing time of the motor and the drive, an electrical or mechanical adjustment must be provided in order to ensure that the contact between the sliding contact 45 and the plate 41 or a contact held parallel thereto remains closed, until the two sliding contacts 43 and 44 can again ensure closure of the motor energizing circuit.

Figure 4:
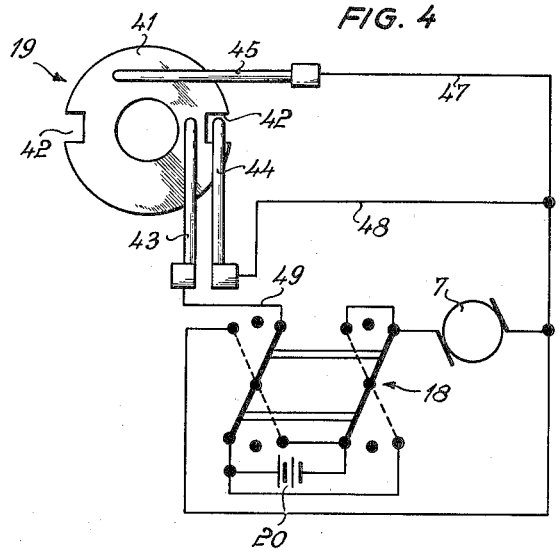
Fig. 4 shows an electric circuit diagram of the electrical parts of the miniature camera.

The electric circuit of the miniature camera constructed according to the invention is shown diagrammatically in Fig. 4. The circuit includes an electric battery 20 for effecting switching which, as shown in Fig. 1, can be disposed in a separate light-tight housing section. The light-tight separation of the battery space facilitates changing of the battery, both with an inserted film and a partially exposed film. The battery space is closed outwardly by a plate 50. Apart from the already described automatic switch device 19 and the motor 7, a main switch 18 is also provided in the electrical equipment. This two-arm main switch 18 has three switch positions. In its first position, which is shown in full lines in Fig. 4, the motor 7 is connected in its forward direction i.e. in the winding direction, by the switch device 19 to the battery 20. In the second or middle switch position, which is not indicated in Fig. 4, the battery 20 is disconnected. In the third switch position, which is shown in Fig. 4 in dotted lines, the motor 7 is connected in the opposite rotational direction, i.e. the re-wind direction, to the battery 20, so that the automatic switch device 19 is outside the drive. To operate the main switch 18, an actuating knob 51 is provided which is passed outside the housing.

In order to enable rewinding of the film with the electric motor, an additional re-wind drive is provided. As shown in Fig. 1, a conventionally constructed film spool 52 can be inserted in the camera. A projection 54 connected with the re-wind knob 53 engages in this film spool 52. The projection 54 embraces a pin 55 which is rigidly connected with the spool core, so that by a rotation of the projection the film can be re-wound from the take-up spool 7 to the film spool 52. A gear wheel 58 is mounted on a cylindrical intermediate piece 57 between the spindle 56 of the re-wind knob and the pin 55 which is pressed by means of a spring 59 against a front surface of the spindle 56. The spindle 56 can be withdrawn by a limited amount by means of the knob 53 from a tubular guide 60 arranged in the camera housing 1, in order to withdraw the projection 54 from the inside of the film spool when changing the spool. For the purpose of electric rewinding, the spindle 56 with the knob 53 can be moved into two different positions in which, in the usual way, it is maintainable by means of grooves 61 and a spring 62 which can engage in the grooves. If the knob 53 is only withdrawn by a small amount from the camera casing, so that the spring 62 engages the middle groove 61, the gear wheel 58 is shifted by a small amount and then engages a gear wheel 63. In this middle setting of the re-wind knob 53 or the spindle 56, the projection 54 is in continuous engagement with the pin 55, so that by driving the gear wheel 58 re-wind movement of the film spool can be carried out. If the re-wind knob 53 is withdrawn further from the casing, the gear wheel 58 is released from the gear wheel 63 and the pin 55 of the film spool is also released by the projection 54, so that the film spool can be changed in the known manner.

Figure 5:
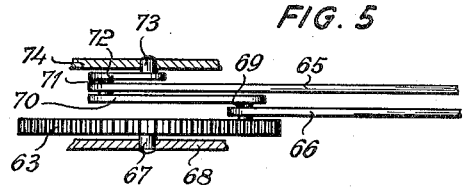
Fig. 5 shows a part of the dead-pointless crank drive of the rewind mechanism on an enlarged scale.

In order to use the movement of the motor for rewinding, a re-wind drive is provided. This drive consists of the gear wheel 64, which continually engages with the motor housing gear wheel 10, the previously described gear wheel 63 and the gear wheel 58 arranged on the projection. The two gear wheels 63 and 64 are of the same size and are connected together by two connecting rods 65 and 66. The two gear wheels 63 and 64 form together with the two connecting rods 65 and 66 a dead-pointless crank drive, which is the same at each of its ends, so that it is sufficient to describe the construction of one end. An enlarged illustration of the crank drive arranged on the gear wheel 63 is illustrated in Fig. 5. The gear wheel 63 is mounted with a pin 67 in a guide plate 68 on the casing 1. On the circumference of the gear wheel 63 is a rotary pin 69 on which the connecting rod 66 is pivoted. Above the pivot point of the connecting rod 66, the pin 69 is connected with a guide arm 70, which at its other end carries a guide pin 71 to which the other connecting rod 65 is pivoted. Above the connecting rod 65, a guide arm 72 is connected with the guide pin 71, whose other end is mounted co-axial to the spindle 67 with a pin 73 in a rigid housing section 74. By the arrangement of the guide arms 70 and 72 and the co-axial supports 67 and 73, the guide pin 71 moves exactly as it would if it were mounted on the gear wheel 63; this arrangement thus permits the two connecting rods 65 to 66 to be moved freely over an exact axial middle line between the spindles 67 and 73. It may be mentioned that the radial spacings between the pins 71 and the spindle 73 and between the pin 69 and the spindle 67 are preferably of the same size.

Because of the afore-mentioned connection of the two gear wheels 63 and 64, the gear wheel 63 moves exactly as it would if it were directly in engagement with the gear wheel 10.

Rewinding with the previously described miniature camera occurs as follows: The re-wind knob 53 is first withdrawn by a slight extent from the camera casing, so that the gear wheel 58 comes into engagement with the gear wheel 63 and the projection 54 remains in engagement with the pin 55. Then the main switch 18 is moved into the re-wind position indicated in dotted lines in Fig. 4. In this position, the motor 7 is directly connected with the battery 20 by by-passing the automatic switch device 19. Since the gear wheel 58 has a considerably smaller diameter than the gear wheel 10 and the gear wheels 63 and 64 are the same size, the gear wheel 58 moves with a considerably greater number of revolutions than the gear wheel 10. This higher rotational speed of the gear wheel 58 is necessary in order to prevent slipping in the film i.e. to ensure that the film is not rewound from the spool 7 more quickly that it is wound up by the spool 52. In order to ensure that the difference in speed and the varying rewind diameters are taken into account, the spring 59 is provided which ensures that the gear wheel 58 acts with respect to the projection 54 as a slipping coupling.

In view of the relatively small electrical loads, the sliding contacts 16, 17, 43, 44 and 45 and also the contact plate 41 are preferably constructed of silver or platinum/iridium.

The above-described invention is not limited to the embodiments illustrated and another source of current can be used instead of a battery installed in the camera casing. Should the camera be provided for such outside current sources, it is preferable to provide an additional plug connection or the like on the camera casing, which is coupled in a simple manner by a cable to the current source, for example the accumulator of a transportable electronic flash device.

The battery installed in the camera casing further permits the use of an ordinary flash device without a separate battery being necessary. For example, as illustrated in Fig. 1, current terminals 76 can be provided in connection with the camera battery in the viewfinder control 75 or in a separate mounting provided for the flash device, one of which is preferably formed from the mass of the camera casing.

What I claim is:

1. In a photographic camera a casing comprising a shutter, a shutter release for releasing said shutter, film winding means for advancing the film, tensioning means adapted to wind up said shutter, reduction gear means for driving said film winding means, an electric motor having a rotor shaft for actuating said gear means and said tensioning means, a housing for said electric motor, said housing being rotatably mounted and constructed as a film winding spool, said reduction gear means drivingly interconnecting said rotor shaft and said film winding spool, a source of current for energizing said electric motor, and circuit means for connecting said source of current with said electric motor in dependence upon the actuation of the shutter release for an operating phase in which the film is advanced for one image length and the shutter is rewound.

2. The invention as claimed in claim 1 wherein said reduction gear is constructed as a planet wheel drive whose input pinion is rigidly connected with the rotor shaft of the electrical motor and whose output gear wheel is connected with the motor housing.

3. In a photographic camera a casing comprising a shutter, a shutter release for releasing said shutter, film winding means for advancing the film, tensioning means adapted to wind up said shutter, reduction gear means for driving said film winding means, an electric motor for actuating said gear means and said tensioning means, a housing for said electric motor, said housing being rotatably mounted and constructed as a film winding spool, said film winding spool being driven by said reduction gear means from the rotor shaft of said electric motor, a source of current for energizing said electric motor, and circuit means for connecting said source of current with said electric motor in dependence upon the actuation of the shutter release for an operating phase in which the film is advanced for one image length and the shutter is rewound, said circuit means containing two preferably concentrically arranged slip rings provided at the front of said electric motor and two brushes which engage said slip rings for supplying electric current to said electric motor.

4. In a photographic camera a casing comprising a shutter, a shutter release for releasing said shutter, film winding means for advancing the film, a crank drive for winding up said shutter, a one-way coupling inserted between said crank drive and said shutter, reduction gear means for driving said film winding means, an electric motor having a rotor shaft for actuating said gear means and said crank drive, a housing for said electric motor, said housing being rotatably mounted and constructed as a film winding spool, said gear reduction means drivingly interconnecting said rotor shaft and said film winding spool, a source of current for energizing said electric motor, and circuit means for connecting said source of current with said electric motor in dependence upon the actuation of the shutter release for an operating phase in which the film is advanced for one image length and the shutter is rewound.

5. The invention as claimed in claim 4 wherein said one-way coupling consists of a sleeve slotted over a part of its circumference and a relatively rotatable shaft mounted therein, and a radially directed pin affixed to said shaft extending into the slot within said slotted sleeve.

6. The invention as claimed in claim 4 wherein for driving said crank drive is arranged a gear wheel engaging said reduction gear means and being provided over a part of its periphery without teeth for an automatic interruption of the driving connection and for bringing to a standstill the tensioning operation of the shutter at the end of the winding movement until the starting position is re-established by the return of the shutter winding shaft after it has been released.

7. In a photographic camera a casing comprising a shutter, a shutter release for releasing said shutter, film winding means for advancing the film, tensioning means adapted to wind up said shutter, reduction gear means for driving said film winding means, an electric motor for actuating said gear means and said tensioning means, a housing for said electric motor, said housing being rotatably mounted and constructed as a film winding spool, said film winding spool being driven by said reduction gear means from the rotor shaft of said electric motor, a source of current for energizing said electric motor, circuit means for connecting said source of current with said electric motor in dependence upon the actuation of the shutter release for an operating phase in which the film is advanced for one image length and the shutter is rewound, and a separate film sprocket engaging in perforations in the film, said film sprocket being provided with contact segments, which cooperate with two sliding contacts interconnected in the energizing circuit of said electric motor as a limiting switch for limiting the motor movement such as to advance the film for one image length only.

8. The invention as claimed in claim 7 wherein said limiting switch consists of two conductive interconnected circular contact strips of which one is interrupted corresponding to the image length by insulating pieces, so that after advance of the film by one image length the connection provided for energizing the motor is interrupted automatically between two sliding contacts, one of which operates the first and the other the second contact strip.

9. In a photographic camera a casing comprising a shutter, a shutter release for releasing said shutter, film winding means for advancing the film, tensioning means adapted to wind up said shutter, reduction gear means for driving said film winding means, an electric motor for actuating said gear means and said tensioning means, a housing for said electric motor, said housing being rotatably mounted and constructed as a film winding spool, said film winding spool being driven by said reduction gear means from the rotor shaft of said electric motor, a source of current for energizing said electric motor, circuit means for connecting said source of current with said electric motor in dependence upon the actuation of the shutter release for an operating phase in which the film is advanced for one image length and the shutter is rewound, a separate film sprocket engaging in perforations in the film, said film sprocket being provided with contact segments, which cooperate with two sliding contacts interconnected in the energizing circuit of said electric motor as a limiting switch for limiting the motor movement such as to advance the film for one image length only, and additional switch means actuated by the shutter release for bridging the two sliding contacts insulated with respect to each other in the starting position, until by movement of the motor, the film is sufficiently advanced for closing said automatic limiting switch.

10. The invention as claimed in claim 9 wherein the additional switch means comprising a third sliding contact which is connected with the sliding contact of the discontinuous contact strip and can be briefly brought into contact, through shutter release, with the continuous contact strip.

11. The invention as claimed in claim 9 wherein said additional switch means is actuated by a cam provided on the winding shaft of the shutter.

12. In a photographic camera a casing comprising a shutter, a shutter release for releasing said shutter, a removable loaded film spool, film winding means for advancing the film, tensioning means adapted to wind up said shutter, reduction gear means for driving said film winding means, an electric motor for actuating said gear means and said tensioning means, a housing for said electric motor, said housing being rotatably mounted and constructed as a film winding spool, said film winding spool being driven by said reduction gear means from the rotor shaft of said electric motor, a source of current for energizing said electric motor, circuit means for connecting said source of current with said electric motor in dependence upon the actuation of the shutter release for an operating phase in which the film is advanced for one image, length and the shutter is rewound, and a driving connection provided between said electric motor and the removable film spool which may be coupled as required in order to rewind the film.

13. The invention as claimed in claim 12 wherein said driving connection between the driving motor and the removable film spool consists of two similar dead-pointless crank drives connected by a parallelogram linkage.

14. In a photographic camera a casing comprising a shutter, a shutter release for releasing said shutter, film winding means for advancing the film, tensioning means adapted to wind up said shutter, reduction gear means for driving said film winding means, an electric motor for actuating said gear means and said tensioning means, a housing for said electric motor, said housing being rotatably mounted and constructed as a film winding spool, said film winding spool being driven by said reduction gear means from the rotor shaft of said electric motor, a source of current for energizing said electric motor, circuit means for connecting said source of current with said electric motor in dependence upon the actuation of the shutter release for an operating phase in which the film is advanced for one image length and the shutter is rewound, and a main switch arranged in the camera casing for controlling the motor, said main switch serves for completely separating the electric motor as desired from the current source, connecting it via an automatic limiting switch to the current source or, for re-winding by closure of the automatic limiting switch, for directly connecting it reversed to the current source.

15. In a camera as defined in claim 12 wherein said removable film spool is supported upon and rotated by an axial displaceable spindle having a rewind knob affixed thereto and a pinion mounted on said spindle comprising a portion of said driving connection to engage said removable spool with said driving connection upon axially displacing said spindle to a predetermined location.

16. In a camera as defined in claim 15 wherein said driving connection is such that said spindle rotates at a faster rate than said motor housing spool and slip clutch means is interposed in the driving connection between said spindle and said removable spool.

17. In a photographic camera employing a load film spool and a film take-up spool, said take-up spool comprising a rotatable electric motor housing, an electric motor having a rotor shaft encompassed within said housing, speed reduction drive means interconnecting said rotor shaft and housing whereby rotation of said shaft rotates said housing and means connecting said motor with an electrical current power source.

References Cited in the file of this patent

UNITED STATES PATENTS

| | | |
|---|---|---|
| 1,235,073 | Spiro | July 31, 1917 |
| 1,331,849 | Gordon | Feb. 24, 1920 |
| 1,448,526 | Dobbin | Mar. 18, 1923 |
| 1,628,580 | De Haes | May 10, 1927 |
| 2,393,534 | Hineline | Jan. 22, 1946 |
| 2,778,578 | Keith | Jan. 22, 1957 |

FOREIGN PATENTS

| | | |
|---|---|---|
| 473,097 | Italy | Dec. 11, 1952 |